United States Patent [19]

Saito

[11] Patent Number: 4,798,274

[45] Date of Patent: Jan. 17, 1989

[54] BALUSTRADE FOR A PASSENGER CONVEYOR

[75] Inventor: Cyuichi Saito, Katsuta, Japan

[73] Assignee: Hitachi, Ltd., Tokyo, Japan

[21] Appl. No.: 907,093

[22] Filed: Sep. 15, 1986

[30] Foreign Application Priority Data

Sep. 20, 1985 [JP] Japan ............................... 60-206514
Nov. 29, 1985 [JP] Japan ............................... 60-267167

[51] Int. Cl.⁴ ............................................. B65G 15/00

[52] U.S. Cl. .................................... 198/324; 198/337; 198/338

[58] Field of Search ................ 198/324, 335, 337, 338

[56] References Cited

FOREIGN PATENT DOCUMENTS

| | | | |
|---|---|---|---|
| 275507 | 6/1964 | Australia | 198/335 |
| 47-9186 | 10/1972 | Japan . | |
| 52-39274 | 3/1977 | Japan | 198/324 |
| 52-61089 | 5/1977 | Japan | 198/324 |
| 52-61086 | 5/1977 | Japan | 198/324 |
| 56-158469 | 11/1981 | Japan . | |
| 58-172185 | 10/1983 | Japan . | |
| 2104471 | 3/1983 | United Kingdom . | |

*Primary Examiner*—Frank E. Werner
*Assistant Examiner*—Cheryl L. Gastineau
*Attorney, Agent, or Firm*—Antonelli, Terry & Wands

[57] ABSTRACT

A balustrade comprises a deck cover disposed on the opposite side to a plurality of steps, a transparent balustrade panel supported by the deck cover, a handrail, a handrail guide frame, secured to an upper edge of the balustrade panel for guiding the handrail moving in synchronism with the plurality of steps, and an illumination device attached directly to the outside surface of the balustrade panel so as to be spaced from the handrail to leave transparent between the handrail and the illumination device. The balustrade further is provided with a supporting pole for supporting the illumination device and containing therein lead wires of the illumination device. The supporting pole has an U-shaped opening and secures an entrance prevention fence with the edge being inserted in the U-shaped opening.

11 Claims, 2 Drawing Sheets

BALUSTRADE FOR A PASSENGER CONVEYOR

BACKGROUND OF THE INVENTION

This invention relates to a balustrade for a passenger conveyor such as a moving stairway, a moving walkway, and particularly to a balustrade for a passenger conveyor excellent in a design and improved on safety at landings.

Recent passenger conveyors are expected to have various factors such as sufficient transportability, a reduced electrid power consumption, a high safety, a good design, etc. Very recently, the passenger conveyor is acknowledged as a high public conveyance and further its safety to passengers is evaluated. On the other hand, passenger conveyors which have an excellent design so as to accord with the modernity of a building design without reducing the safety to passengers are desired.

In general, a passenger conveyor is constructed of a moving part and a stationary part. The moving part comprises a plurality of steps arranged endlessly to circulate between first and second landings and a pair of moving handrails disposed on the opposite sides of the steps and circulating in synchronism with the circulating steps. The stationary part comprises floors and combs constituting the first and second landings and balustrades. All the above-mentioned parts are supported on building floors by a frame.

An example of the balustrade for supporting the moving handrail is disclosed in GB No. 2104471A, FIG. 3, and constructed of a balustrade panel made of glass, a handrail frame secured to the upper edge through a packing, and a guide secured to the handrail frame and guiding the handrail. The handrail frame has projections one of which projects into a step side by a distance 1*b* and the other into the opposite side to the step side by a distance 1*a*. An illumination device is provided on the under side of the projection on the opposite side to the steps side.

The balustrade gives passengers a feeling of grandness, however, it has disadvantages or troubles one of which reduces a feeling of transparency by a part of the handrail frame existing between the handrail and the upper edge of the balustrade panel, and another is falling or stumbling caused by touching the projection directed toward the step side with short children's arms.

Another example of the balustrade is disclosed in FIG. 4 of the same publication. The balustrade is constructed of a glass panel, a guide frame which is fixed to the glass panel by fastening bolts passing through notches made in an upper portion of the glass panel, and guide members covering the upper surface of the guide frame and guiding the moving handrail. The guide frame and the guide members are formed so that they all are substantially within the moving handrail. Therefore, the balustrade can solve the above-mentioned disadvantages, that is, the problem relating to the safety and reduction of the transparency. Additionally, the balustrade is watched as a simple and light balustrade construction which is designed in a highly individual style and has a high safety. However, since the balustrade is not provided with a handrail frame such as provided in the balustrade in FIG. 3 of the UK Patent Application GB No. 2104471A, the balustrade has a disadvantage such that an illumination device can not be mounted in a good style. The balustrade not provided with the illumination device, in particular, is unsatisfactory under the low-illumination circumferences because foot portions of the passengers can not be illuminated well at the landings.

An example of this kind of the balustrade on which a lamp is mounted is disclosed in Japanese Utility-Model Laid-Open No. 56-158469. The balustrade, however, has an opaque portion between the moving handrail and the lamp, which reduces a feeling of transparency. Japanese Utility-Model Laid-Open No. 47-9186 discloses lamp wirings led into the conveyor interior. Further, an usual passenger conveyor is provided with an entrance-prevention fence which is disclosed in Japanese Utility-Model Laid-Open No. 58-192869. In the above-mentioned construction, the mounting construction is somewhat complicated.

As mentioned above, the conventional passenger conveyors have drawbacks with respect to a safety, mounting of parts of the illumination device or a transparency feeling.

Further, when children and old men get on or get off the running steps from the stationary of the floor and the comb, they may lose their balance and fall sometime there. As measures to this accident, there is needed means for illuminating the landings so as to make clear a boundary between the stationary part and the moving part at the landings and existance of the landings, whereby persons met with accidents are watched and saved early and quickly.

SUMMARY OF THE INVENTION

An object of the present invention is to provide a balustrade for a passenger conveyor which is free from the above-mentioned drawbacks, and which is elevated in safety at the landings and excellent in a design.

In order to achieve the object, a balustrade for a passenger conveyor according to the present invention is provided with an illumination device which is attached directly to a transparent balustrade panel so as to project outside the balustrade panel around the landings so that a transparent portion is made between the illumination device and a moving handrail of the passenger conveyor.

According to an aspect of the present invention, the balustrade for a passenger conveyor comprises an illumination device attached directly to a transparent balustrade panel on the outside so that the balustrade panel is left transparent between a handrail guide frame and the illumination device, a hollow supporting pole provided so as to support the illumination device and contain therein lead wires of the illumination device, and an entrance prevention device of which a vertical edge is inserted in an opening formed in the supporting pole and fixed to the supporting pole.

According to another aspect of the present invention, the balustrade for a passenger conveyor comprises an illumination device attached directly to a transparent balustrade panel on the outside so that the balustrade panel is left transparent on the upper and lower sides of the illumination device, a hollow supporting pole provided so as to support the illumination device and contain therein lead wires, and a decorative member provided on the balustrade panel at the position opposite to the illumination device, the decorative member having a display portion a part of which is light-permeable and displays a letter, a drawing, etc by a light from the illumination device.

DESCRIPTION OF THE PREFERRED EMBODIMENTS

Figure 1:
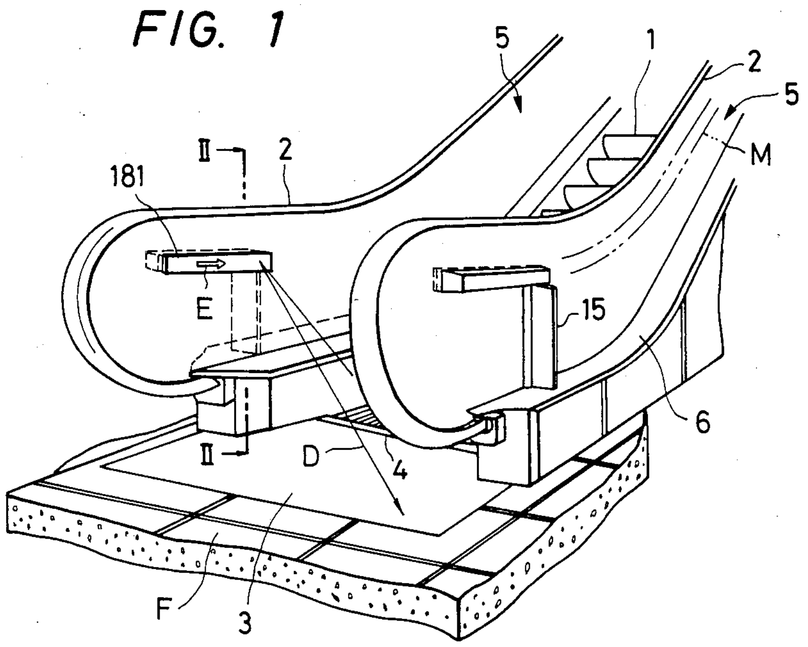
FIG. 1 is a perspective view showing an embodiment of a balustrade for a passenger conveyor according to the present invention.

An embodiment of a balustrade for a passenger conveyor is described hereunder in detail referring to the drawings.

In FIG. 1 showing part of a passenger conveyor around a landing, the passenger conveyor consists of a moving part and a stationary part. The moving part comprises a plurality of steps 1 connected together so as to circulate endlessly between a first and second landings and a pair of moving handrails 2 disposed on the opposite sides of the circulating steps 1. The stationary part comprises floor plates 3 and combs 4 constituting the first and second landings and a pair of balustrades 5 including a deck cover 6. The moving and stationary parts are supported on floors F of a building by a body frame (not shown).

Figure 2:
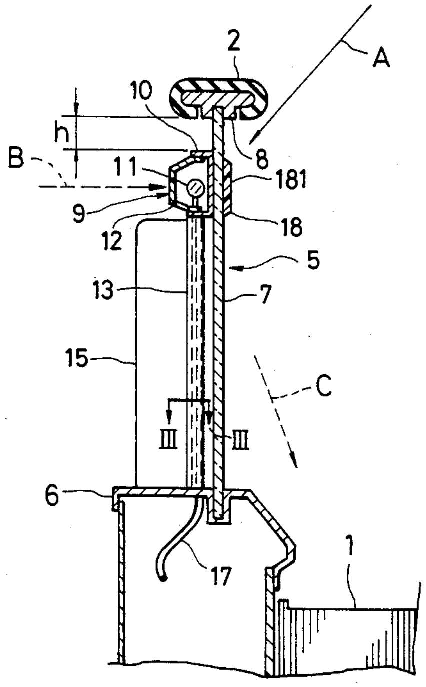
FIG. 2 is a sectional view taken along a line II—II of FIG. 1.

Referring to FIG. 2, the balustrade 5 comprises the deck cover 6 consisting of an outer and inner decks and disposed on the opposite side of the passenger conveyor to the steps 1, a transparent balustrade panel 7 made of glass and supported by the deck cover 6 at the lower edge, a handrail guide frame 8 fixed to an upper edge of the balustrade panel 7, and the handrail 2 guided by the handrail guide frame 8. The handrail guide frame 8 is contained substantially within the handrail 2.

Figure 3:
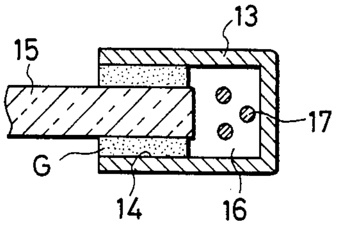
FIG. 3 is a sectional view taken along a line III—III of FIG. 2.

The balustrade 5 is provided with an illumination device 9. The illumination device 9 comprises a lamp supporter 10 extending in the direction of a handrail running direction and fixed directly to the balustrade panel 7 by bonding, a lamp 11 disposed in and mounted on the lamp supporter 10, a lamp cover 12 fitted to the lamp supporter 10. The balustrade 5 is further provided with a supporting pole 13 disposed between the lamp supporter 10 and the deck cover 6 so as to stand on the deck cover 6 and support the lamp supporter 10 to prevent the illumination device 9 from being removed from the balustrade panel 7. As shown in FIG. 3, the supporting pole 13 has a U-shaped section, taken by a plane perpendicular to the axis of the supporting pole 13, all over the length, whereby an opening 14 extending along the length is formed. In the opening 14, an entrance prevention fence 15 for preventing persons from entering an area that is prohibited to enter is inserted and fixed to the supporting pole 13 by an adhesion G so that an axially elongated hollow 16 is defined by the inner surface of the U-shaped opening 14 of the supporting pole 13 and the end portion of the entrance prevention fence 15 inserted in the U-shaped opening 14. Lead wires 17 for supplying electric power to the lamp 11 are inserted in the axially elongated hollow 16 of the supporting pole 13.

The illumination device 9 constructed as mentioned above is disposed on the outside surface of the balustrade panel 7 at the position spaced vertically from the handrail 2 by a distance h (more than 25 mm and preferably about 100 mm) to be higher than the middle of the balustrade panel 7 between the handrail guide frame 8 and the deck cover 6. The location of illumination device 9 is such that the portion of the balustrade panel 7 between the handrail 2 and the illumination device 9 is left transparent and a light can be passed through the transparent portion into the inside of the balustrade panel 7, where is, the interior that the steps 1 are disposed. The illumination device 9 is disposed on the panel 7 around the first and second landings. An illumination light from the illumination device 9 is caught by the passengers on the steps 1 in a direction shown by an arrow A, and by the passengers who are going to use the passenger conveyor in a direction shown by an arrow B. Further, the illumination device 9 illuminates the passenger's foot portions at the landing by an illumination light in a direction shown by an arrow C.

The balustrade 5 formed thus, has the lamp 11 at a position close to the balustrade panel 7, so that the shadow made by the lamp supporter 10, etc. is reduced. Further, the balustrade 5 has the illumination device 9 spaced from the handrail 2. Therefore, the inside of the balustrade 5 is illuminated by a light passing through the transparent portion between the handrail 2 and the illumination device 9 and the shadow made by the illumination device 9 is reduced, so that the balustrade 5 gives the passengers feeling of simplicity, brightness and transparency.

The balustrade 5 can illuminate intensively foot portions of passengers at the landings, so that a boundary between the moving part and the stationary part is made clear, and it is easy to get on and get off. Passengers can notice early the existance of the passenger conveyor, so that it is convenient to use it. When the distance h is made large, for example 100 mm, the light can be caught by eyes of passengers in a direction of the arrow A, so that the existance of the landings can be noticed well.

On the inside of the balustrade panel 7 to which the illumination device 9 is attached directly, a decorative member 18 the surface 181 of which is finished as in a mirror surface is provided to cover the back side of the illumination device 9 so as to provide a good appearance, and in addition to this, the mirror surface decorative panel enables persons out of the passenger conveyor to see an abnormal condition at the landings such as passenger falls in the direction as shown an arrow D of FIG. 1. Further, as shown in FIG. 1, an arrow E made on the decorative member surface 181 for indicating the running direction of the passenger conveyor renders services to passengers.

The construction that the illumination device 9 is attached directly to the balustrade panel 7 with the distance h changed drastically the design thought which has been generalized to be on the promise that an illumination device was installed on a moving handrail guide frame which projects downwards from a handrail and toward the outer and inner sides of a balustrade panel as described in the background of the invention. The change in design is remarkable.

Further, the construction that the entrance prevention fence 15 is fixed by the supporting pole 13 and the lead wires 17 is inserted in the supporting pole 13 contributes to making strong the illumination device 9, simplifying the fence shape and a good appearance of the passenger conveyor.

Figure 4:
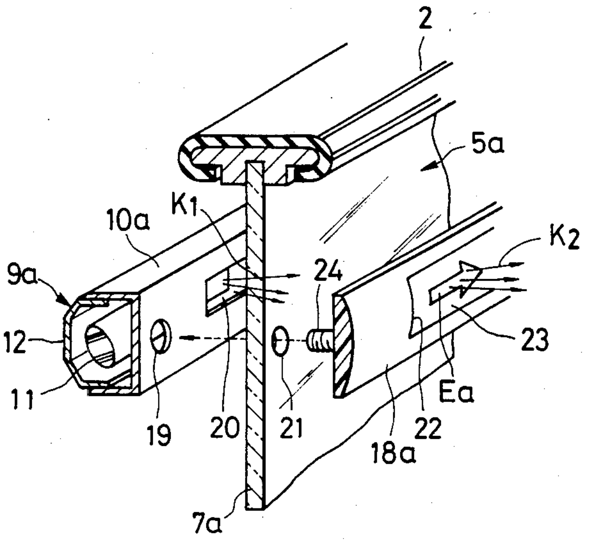
FIG. 4 is a perspective view showing another embodiment of a balustrade of the passenger conveyor according to the present invention.

Another embodiment of the balustrade for the passenger conveyor is described hereunder, referring to FIG. 4. In FIG. 4, an illumination device *9a* comprises a lamp supporter 10*a*, the lamp 11, and the lamp cover 12 as in FIG. 2. The lamp supporter 10*a* has mounting holes 19 and an opening 20 for passing an illumination light, and mounted on a balustrade panel *7a* made of transparent glass. The balustrade panel *7a* also has mounting holes 21, perforated at positions corresponding to the mounting holes 19 of the lamp supporter 10*a*. A decorative member 18*a* has a window 22 in which a sheet member 23 is fitted to form a display portion. The decorative member 18*a* is opaque and the sheet member 23 is made of transparent material such as acrylic acid resin. The sheet member 23 has a letter or a drawing printed on the surface. An example of printed drawing is an arrow Ea and, the outside of the arrow Ea is subjected to a light interruption treatment so that only the inside of the printed arrow Ea is light-permeable and can allow a light to pass therethrough. The decorative member 18*a* has bolts 24 inserted partially thereinto. The bolts 24 pass through the mounting holes 21, 19 of the balustrade panel *7a* and the lamp supporter 10*a* and fasten the decorative member 18*a*, the balustrade panel *7a* and the lamp supporter 10*a* by nuts (not shown) so as to sandwich the balustrade panel *7a*. The printed allow Ea is positioned so that the light from the opening 24 of the lamp supporter 10a can pass through the light-permeable portion of the printed allow Ea.

The construction of the balustrade *5a* of this embodiment other than described above is the same as the embodiment shown in FIGS. 1 to 3.

The balustrade *5a* can illuminate the inside of the balustrade *5a* through the inside of the printed arrow Ea in a course of $K_1$ and $K_2$ as well as the upper and lower transparent portions of the balustrade panel *7a*.

by the addition of the light passing through the decorative member 18*a*, the foot portions of passengers at the landings can be illuminated further intensively, so that the boundary between the stationary part and the moving part can be made clearer, it is easy to get on and get off and the safety is improved more. Only the lamp 11 can illuminate such a display portion as provided with the printed arrow Ea as well as the illumination of the surroundings at the same time. Further, when matters that demand special attention with respect to the use of the passenger conveyor, for example, "Please get on the step at the central portion" or a running direction is shown on the display portion of the decorative member 18*a*, the passenger conveyor has an effect that attracts passenger's attention as well as the effect of the illumination. Further, it is convenient for passengers to find out quickly the existance of the passenger conveyor and use it.

Figure 5:
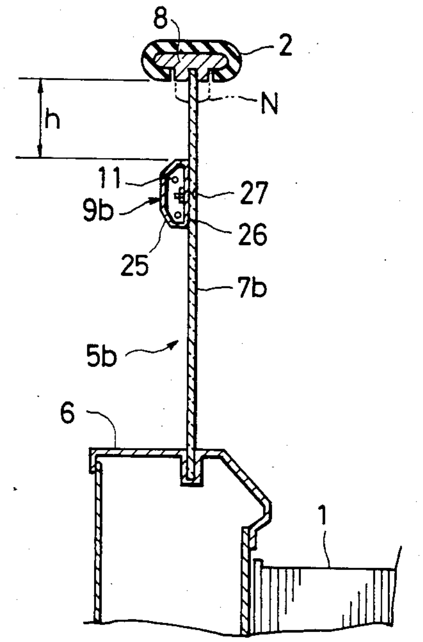
FIG. 5 is a sectional view showing a modification of the embodiment of a balustrade shown in FIGS. 1 to 3.

A modification of the embodiment shown in FIGS. 1 to 3 will be described hereunder referring to FIG. 5.

An illumination device *9b* comprises a protector 25 which is tubular and elongated along a running direction of the handrail 2, and lumps 11 disposed in and attached to the protector 25. The protector 25 has a backside which is made into a minor surface 26. The backside 26 of the protector 25 is mounted on the balustrade panel *7b* by screws 27. The illumination device *9b* is spaced from the handrail 2 by a distance h more than 25 mm. The handrail frame 8 is fine if a part of the frame 8 is out of the handrail 2, that is, it projects downwards as shown by a dotted line N. However, the balustrade *5b* is necessary to have a transparent portion at the upper and lower portions of the illumination device *9b*.

Further, the installation position of the illumination device is not limited to the position around the landings. The illumination device can be arranged over substantially the entire length of the passenger conveyor as shown by M of FIG. 1.

What is claimed is:

1. A balustrade for a passenger conveyor comprising:
- a deck cover provided in said passenger conveyor on an opposite side to a plurality of steps arranged endlessly to circulate;
- a transparent balustrade panel, supported on said deck cover and having an inner surface opposite to said steps on the inside and an outer surface opposite to said inner surface on the outside;
- a handrail;
- a handrail guide frame, fixed to an upper edge of said balustrade panel, for guiding said handrail moving in synchronism with said plurality of steps;
- an illumination device, positioned around a landing to illuminate the outside of said balustrade panel and fixed to said balustrade panel on the outer surface at a position that is higher than one-half of a distance between said deck cover and said handrail guide frame so that said balustrade panel is left transparent on upper and lower sides of said illumination device, whereby the inside of said balustrade panel is illuminated by a light passing through the upper and lower transparent portions of said balustrade panel; and
- a hollow supporting pole disposed between said deck cover and said illumination device and containing therein lead wires of said illumination device, said hollow supporting pole with said transpareant panel providing a sole support for said illumination device.

2. A balustrade as defined in claim 1, further including an entrance prevention fence provided for preventing persons from entering an area that is prohibited to enter, and a vertically elongated edge of said entrance prevention fence being inserted in an opening vertically formed in said supporting pole and fixed to said supporting pole.

3. A balustrade as defined in claim 1, wherein a decorative member is provided on said balustrade panel on the opposite side to said illumination device to illuminate the outside of said balustrade panel, said decorative member having bolts each of which has a part thereof inserted in said decorative member and the other threaded and projecting therefrom, and said illumination device is fixed to said balustrade panel by said decorative member.

4. A balustrade as defined in claim 3, wherein said decorative member has a display portion a part of which forms a light-permeable portion, said light-permeable portion is formed in at least one of a letter and a drawing whereby said at least one of letter and drawing is displayed by light.

5. A balustrade for a passenger conveyor comprising:
- a deck cover provided in said conveyor on an opposite side to a plurality of steps arranged endlessly for conveying passengers from one landing to another landing;
- a transparent balustrade panel supported on said deck cover and having an inner surface opposite to said steps and an outer surface opposite to said inner surface;

a handrail;

a handrail guide frame, fixed to an upper edge of said balustrade panel, for guiding said handrail moving in synchronism with said steps;

an illumination device fixed directly to said outer surface of said balustrade panel so as to be spaced from said handrail by a distance thereby providing upper and lower transparent portions of said balustrade panel around one of said landings, said illumination device being higher than the middle of said balustrade panel between said handrail guide frame and said deck cover;

a decorative member provided on said balustrade panel on the opposite side to said illumination device;

a display portion provided in said decorative member, said display portion including a light-permeable portion which is illuminated by light from said illumination device; and a supporting pole disposed between said deck cover and said illumination device, said supporting pole having a channel with substantially U-shaped walls when viewed in a direction perpendicular to the axial direction of said supporting pole, and holding lead wires of said illumination device, said supporting pole with said transparent panel providing a sole support for said illumination device.

6. A balustrade as defined in claim 5, wherein said light-permeable portion forms a letter or a drawing, whereby a light from said illumination device lightens said display portion to display said letter or drawing.

7. A balustrade as defined in claim 5, wherein said decorative member has bolts inserted therein with screw portions projecting therefrom, and said illumination device is fixed to said balustrade panel by said bolts and nuts to be fitted thereon so as to sandwich said balustrade panel between said illumination device and said decorative member.

8. A balustrade as defined in claim 7, wherein said illumination device comprises a lamp supporter, a lamp supported by said lamp supporter, and a lamp cover fitted in said lamp supporter, said lamp supporter having an opening, at a position corresponding to said light-permeable portion, for allowing a light from said lamp to pass through and mounting holes, said bolts passing through said mounting holes made in said balustrade panel and said lamp supporter and fastening said lamp cover to said balustrade panel so that said decorative member and said illumination device are fixed to said balustrade panel by said nuts.

9. A balustrade for a passenger conveyor comprising:

a deck cover provided in said passenger conveyor on an opposite side to a plurality of steps arranged endlessly for conveying passengers from one landing to another landing;

a transparent balustrade panel supported on said deck cover and having an inner surface opposite to said steps and an outer surface opposite to said inner surface;

a handrail;

a handrail guide frame, fixed to an upper edge of said balustrade panel, for guiding said handrail moving in synchronism with said steps;

an illumination device fixed directly to said outer surface of said balustrade panel at a position that is higher than one half of a distance between an upper side of said deck cover and a lower side of said handrail guide frame around one of said landing portions and that is spaced from said lower side of said handrail guide frame so as to provide upper and lower transparent portions of said balustrade panel, said illumination device being oriented to emit illumination to illuminate the outside of said balustrade panel and part of the illumination passing through said upper and lower transparent portions of said balustrade panel to illuminate the inside of said balustrade panel;

a decorative member provided on said balustrade panel on the opposite side to said illumination device;

fixing means, enclosed in and common to said illumination device and said decorative member, for fixing both said illumination device and said decorative member to said transparent balustrade panel;

a display portion provided in said decorative member, said display portion including a light-permeable portion which is illuminated by light from said illumination device passing through transparent material of the panel; and a hollow supporting pole disposed between said deck cover and said illumination device, said supporting pole enclosing therein lead wires of said illumination device, said hollow supporting pole with said transpareant panel providing the sole support for said illumination device.

10. A balustrade as defined in claim 9, wherein said illumination device fixed to said balustrade panel is spaced beneath said handrail guide frame by the distance of more than 25 mm.

11. A balustrade as defined in claim 10, wherein said illumination device is fixed by said decorative member having bolts partially inserted therein, with screw portions thereof projecting therefrom.

* * * * *